United States Patent
Edlis

[15] 3,645,492
[45] Feb. 29, 1972

[54] EJECTION ACTUATOR FOR PLASTIC INJECTION MOLD

[72] Inventor: Stefan T. Edlis, 400 Ridge, Elmhurst, Ill. 60126

[22] Filed: Dec. 30, 1969

[21] Appl. No.: 889,043

[52] U.S. Cl............................249/68, 18/42 D, 18/2 RP
[51] Int. Cl...................................B29c 7/00, B29f 1/14
[58] Field of Search............18/2 RP, 42 D, 42 M; 249/66, 249/67, 68

[56] References Cited

UNITED STATES PATENTS

| | | | |
|---|---|---|---|
| 2,483,094 | 9/1949 | Harvey | 249/68 |
| 3,044,120 | 7/1962 | Wiskoff et al. | 249/68 |
| 2,739,349 | 3/1956 | Strauss | 18/2 RP X |
| 2,987,772 | 6/1961 | Beatty | 249/68 |
| 3,252,180 | 5/1966 | Houk | 18/2 RP |
| 3,334,378 | 8/1967 | Scherrer-Wirz et al. | 18/2 RP |
| 3,142,863 | 8/1964 | Mazzoni | 18/2 RP |
| 3,534,443 | 10/1970 | Tucker | 18/2 RP X |
| 2,774,990 | 12/1956 | Soderquist | 18/2 RP |

Primary Examiner—J. Howard Flint, Jr.
Attorney—Kinzer, Dorn and Zickert

[57] ABSTRACT

An ejection actuator for a plastic injection mold comprising a cylinder built into the ejector plate of the mold base, a free piston engaging the ejector housing and projecting into the cylinder, and a fluid pressure inlet with a metering orifice for introducing air or other fluid, under pressure, into the cylinder; the complete actuator, other than the fluid source, is located entirely within the mold base.

8 Claims, 5 Drawing Figures

Patented Feb. 29, 1972

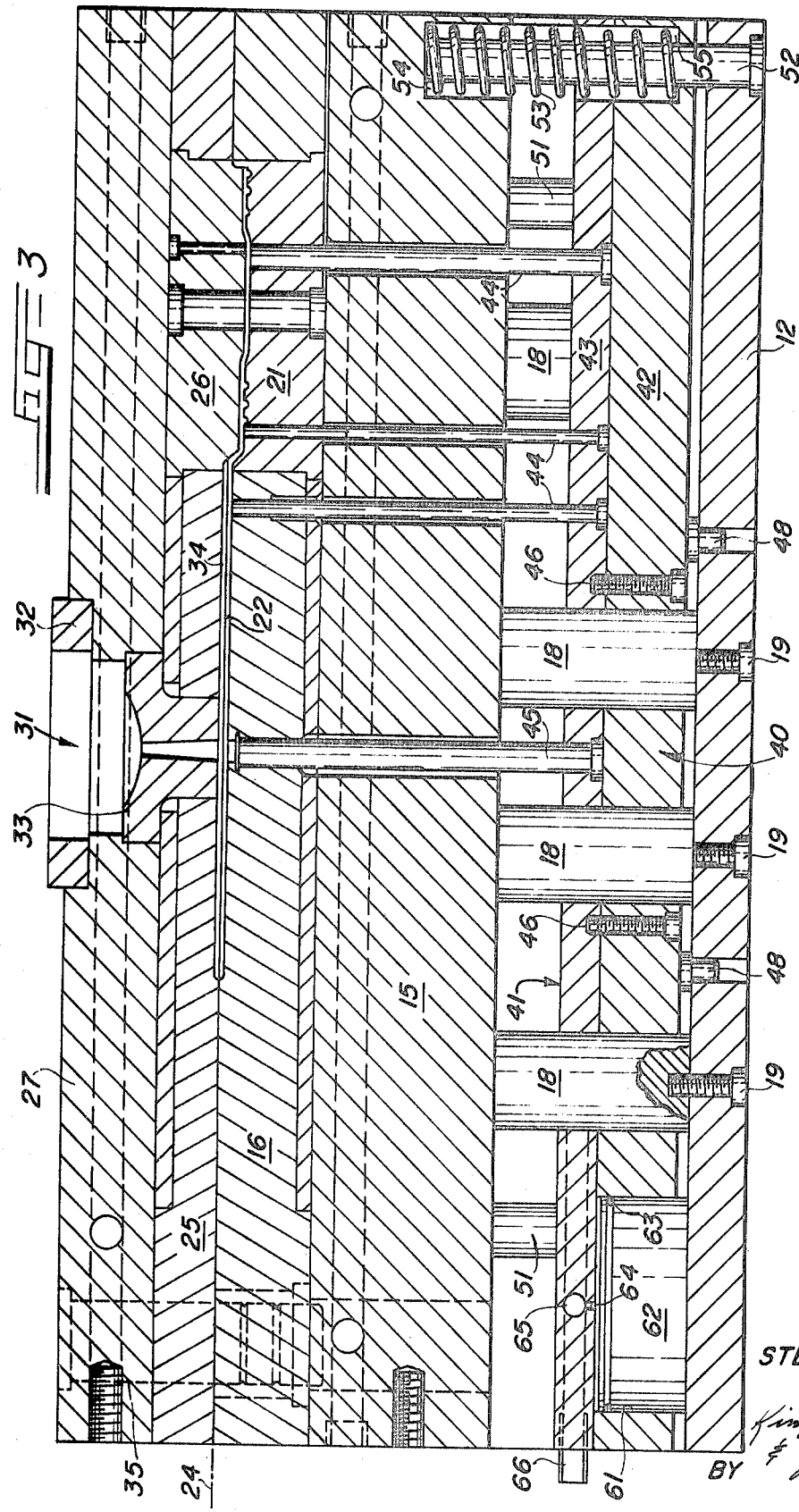

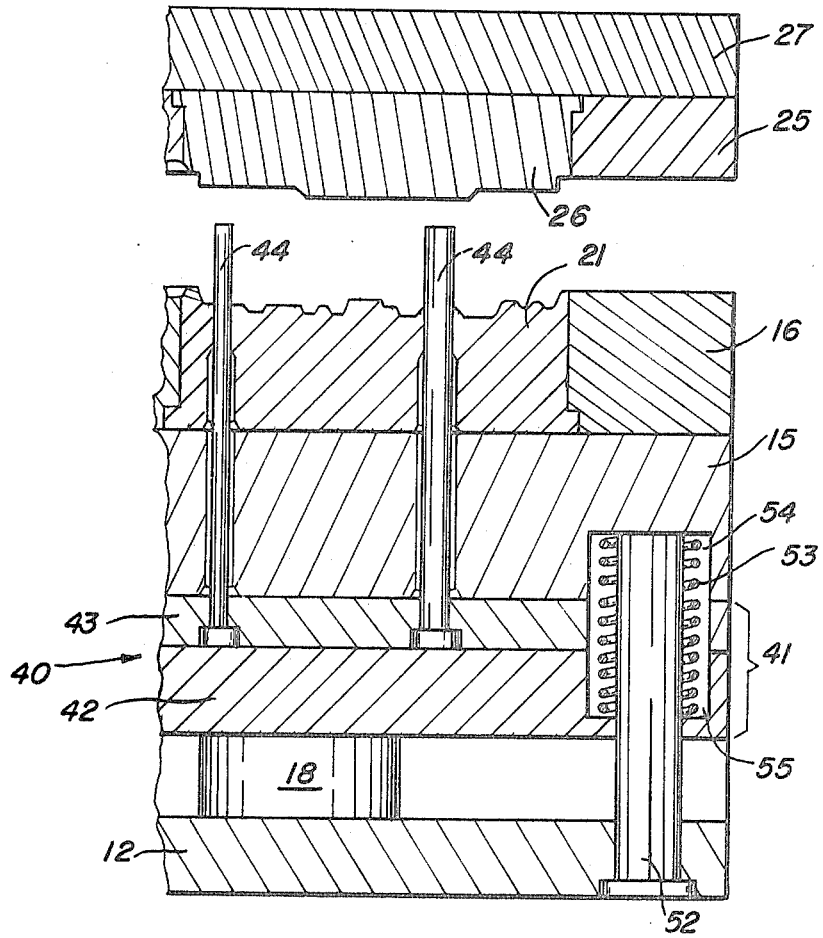
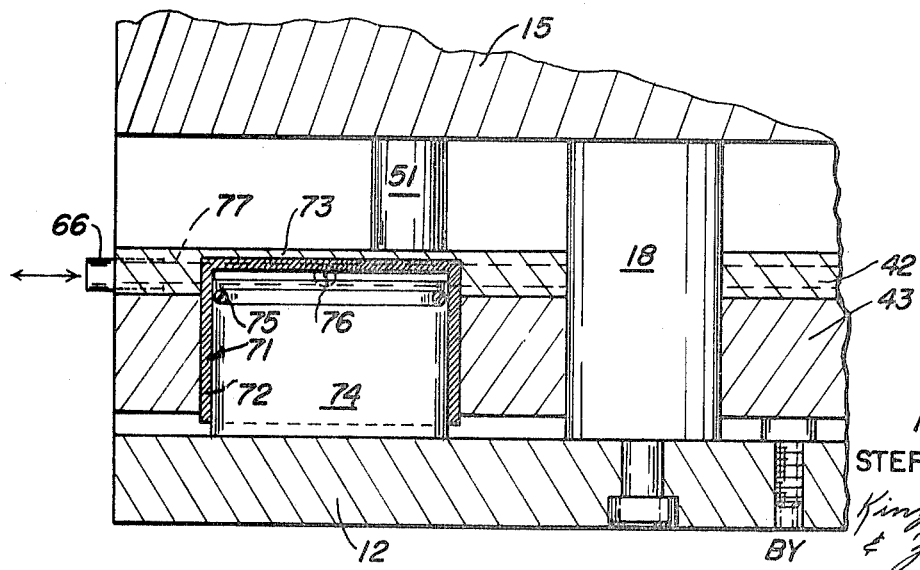

3,645,492

EJECTION ACTUATOR FOR PLASTIC INJECTION MOLD

BACKGROUND OF THE INVENTION

In the molding apparatus used for injection molding of plastic products, it is customary to mount the mold core and cavity members in a mold base that can then be mounted in an injection molding press. Mold base construction is generally standardized. A conventional mold base usually includes an ejector apparatus, actuated when the mold is opened following a molding operation, that positively ejects the plastic article from the mold. Actuation of this ejector apparatus, however, is effected by an actuating mechanism that is not a part of the mold base, being included in the injection molding press.

Two different arrangements have been employed for actuation of the ejector apparatus in an injection mold base. The most commonly utilized ejector actuation arrangement employs one or more apertures in the bottom of the mold base; these apertures are aligned with a corresponding number of knockout members or shafts incorporated in the press. As the mold is opened, the bottom part of the mold base is moved to a position within the press in which the knockout members project through the apertures in the mold base, engaging the ejector apparatus in the mold base and driving it from a normal retracted position to an ejection position. This movement of the ejector apparatus impels a plurality of ejector pins through the mold cavities and feeder channels in the mold base, ejecting the molded articles.

The second expedient that has been employed for ejector actuation comprises a pneumatic cylinder affixed to the mold base and having a piston that engages the ejector apparatus in the mold base. External operating cylinders of this kind present substantial problems with respect to space, in the press in which the mold base is used, and are not always practical in relation to given mold requirements. Indeed, both of the conventional ejector actuating mechanisms discussed above present substantial problems in coordinating the operation of the ejector apparatus with the requirements of the mold base with respect to internal water cooling connections, supports, and the interfit of the mold base with the injection molding press.

SUMMARY OF THE INVENTION

It is a primary object of the invention, therefore, to provide a new and improved ejector actuating mechanism for a mold base for plastic injection molding that is simple and inexpensive in construction and that is completely within the mold base.

Another object of the invention is to provide a new and improved internal ejector actuating mechanism for a mold base used in plastic injection molding that can be simply and easily controlled in its operation and that affords maximum speed of operation consonant with the safety of the mold base.

An additional object of the invention is to provide a new and improved internal ejector actuating mechanism for a mold base used in plastic injection molding that is adaptable for use with virtually any mold base and with virtually any injection molding press at minimum expense.

Accordingly, the present invention is directed to an internal ejector actuating mechanism for a mold base for plastic injection molding, of the kind comprising an ejector housing having a base member, cavity support means mounted on the housing in fixed spaced relation to the base member and having at least one mold cavity mounted therein, and ejector means disposed within the housing. The ejector means includes an ejector support and a plurality of ejector elements mounted on and extending from the ejector support through the cavity support means. The mold base further comprises guide means for guiding movement of the ejector means between a retracted position in which the ejector support is disposed adjacent the housing base member and the ejector elements are aligned wi the bottom of the mo cavity, and an ejection position in which the ejector support is displaced from the housing base member and the ejector elements project into the cavity. The internal ejector actuating mechanism comprises at least one ejector actuation cylinder extending into the ejector support, the cylinder having an open end facing the housing base member and a closed end remote from that base member. A free piston is disposed within the cylinder in fluid sealing relation therewith and projects outwardly of the cylinder into engagement with the housing base member. Fluid pressure means are provided for introducing fluid under pressure into the closed end of the cylinder to drive the ejector means from its retracted position to its ejection position; return means for returning the ejector means to its retracted position upon release of the fluid pressure within the cylinder are also provided.

BRIEF DESCRIPTION OF THE DRAWINGS

FIG. 3 is a sectional view, taken approximately along line 3—3 in FIG. 1, illustrating another part of the ejector actuating mechanism of the invention with the mold base closed;

FIG. 4 is a partial sectional view, similar to FIG. 3, showing the mold base open with the ejector apparatus actuated; and FIG. 5 is a fragmentary sectional view, similar to FIG. 2, of a modified form of ejector actuating mechanism constructed in accordance with the invention.

DESCRIPTION OF THE PREFERRED EMBODIMENTS

Figure 1:
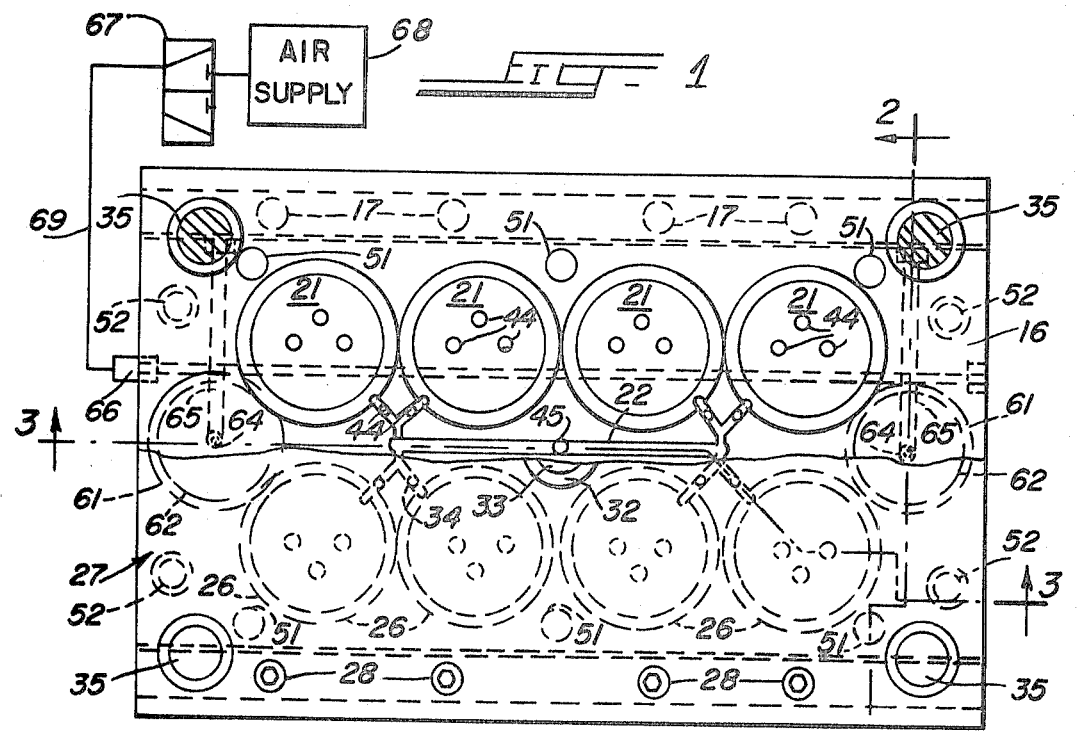
FIG. 1 is a plan view of a mold base, partially cutaway to show some of the mold cavities, including a schematic representation of a fluid supply and control for an ejector actuating mechanism constructed in accordance with the present invention.
Figure 2:
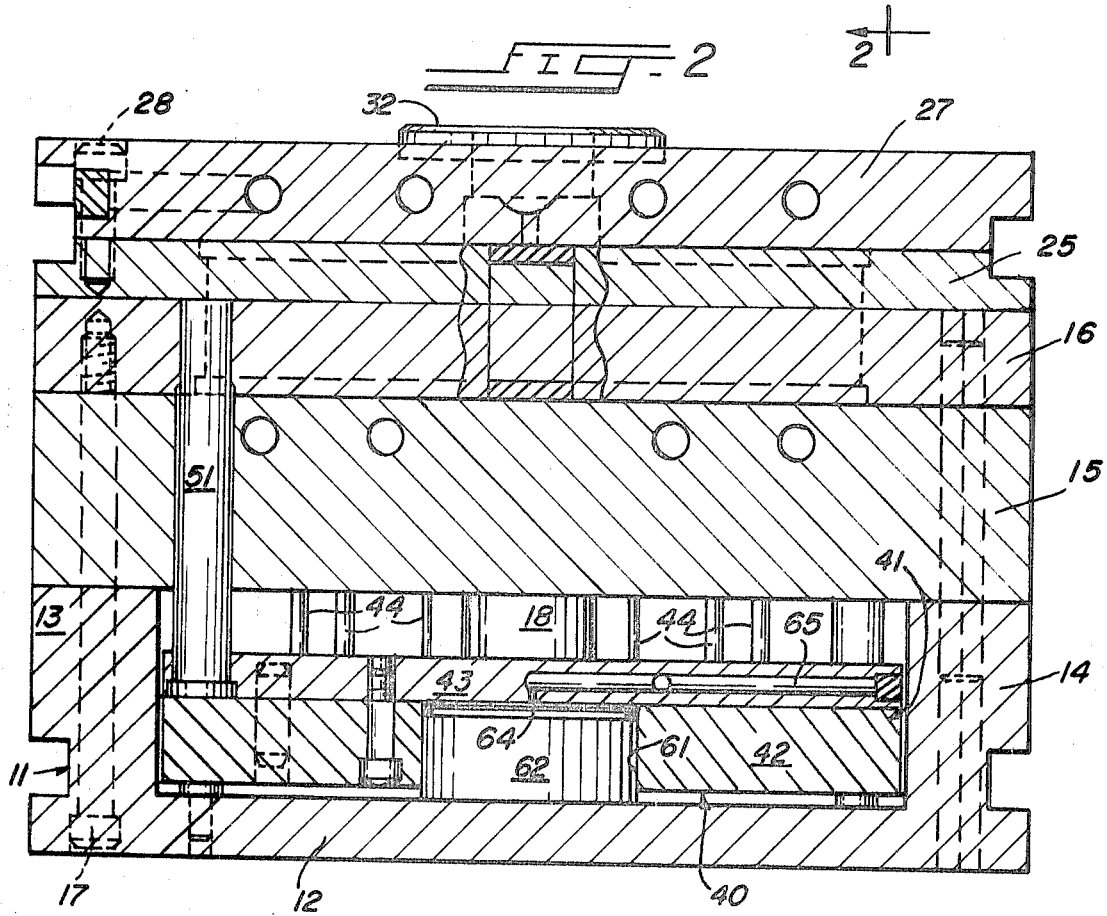
FIG. 2 is a sectional view taken approximately along line 2—2 in FIG. 1, illustrating a part of the ejector actuating mechanism of the invention with the mold base closed.

FIGS. 1–4 illustrate a mold base 10 in which an internal ejector actuating mechanism constructed with the present invention is incorporated. Except for the ejector actuating mechanism, mold base 10 is quite conventional in construction. The mold base comprises an ejector housing 11 that is generally U-shaped in cross-sectional configuration, including a base member 12 and two walls 13 and 14, as best shown in FIG. 2. A backup plate 15 is supported upon the two walls 13 and 14 of ejector housing 11, spanning the space between the two walls of the ejector housing. A cavity retainer plate 16 is supported upon backup plate 15. Ejector housing 11, backup plate 15, and cavity retainer plate 16 are mounted together in a rigid structure by means of a plurality of elongated capscrews 17 that extended from the base member 12 of the ejector housing through walls 13 and 14 and through backup plate 15, the capscrews being threaded into appropriate openings in the cavity retainer plate 16.

Backup plate 15 and cavity retainer plate 16 together constitute the cavity support means for mold base 10. As described above, this cavity support means is mounted upon the ejector housing 11 in fixed spaced relation to the base member 12 of the housing. Additional support for the central portion of the cavity support means is provided by a plurality of support pillars 18 interposed between backup plate 15 and ejector housing base member 12; pillars 18 are affixed to base member 12 by appropriate means such as individual capscrews 19.

A plurality of mold cavity members 21 are mounted in cavity retainer plate 16; in the illustrated mold base 10 there are a total of eight cavity members 21. The upper surface of the cavity retainer plate 16 includes a channel 22 that interconnects all of the cavity members 21 to permit the feeding of plastic into the cavities during a molding operation. The upper surface of cavity retainer plate 16 defines the parting line 24 for the mold base.

The upper portion of mold base 10 comprises a core retainer plate 25 in which a plurality of core members 26 are mounted, the number and arrangement of core members 26 corresponding to the number and arrangement of cavity members 21. Core retainer plate 25 is mounted upon a top clamping plate 27 by appropriate means such as a series of capscrews 28. The central portion of each of plates 25 and 27 includes a central sprue opening 31 fitted with a locating ring 32 and an internal sprue bushing 33. Sprue bushing 33 has a central opening that leads to a channel 34 in core retainer plate 25 that is aligned with the channel 22 in cavity retainer plate 21, permitting a flow of plastic from the sprue to all of the eight molds in the base 10.

To align the core support comprising plates 25 and 27 with the remainder of the mold base, a plurality of leader pins 35 are mounted in the core support. Leader pins 35 project into appropriate apertures in cavity retainer plate 16 and backup plate 15, permitting opening and closing of the mold at parting line 24 without misalignment.

Mold base 10 (FIGS. 1-4) further comprises an ejector means 40 for ejecting finished molded articles from the mold base. Ejector means 40 is of conventional construction and includes an ejector support 41 comprising an ejector plate 42 and an ejector retainer plate 43. Ejector plate 42 is affixed to retaining plate 43 by a plurality of capscrews 46. The ejector means 40 of mold base 10 further comprises a plurality of individual ejector elements or pins 44. Each of the ejector pins 44 has a head 47 that fits in a socket in retainer plate 43 and that is held in firm engagement with ejector plate 42 by retainer plate 43. Each of the ejector pins extends from the ejector support 41 through the cavity support means comprising backup plate 15 and cavity retainer plate 16 and terminates at the parting line of the mold base. Many of the ejector pins are aligned with and extended through the cavity members 21; the upper ends of these pins are aligned with the bottom surfaces of the mold cavities. Other ejector pins 44 are aligned with the various branches of the channel 22,34 and terminate in approximate coincidence with the bottom of channel 22. One ejector pin 45 is located at the center of mold base 10 in alignment with the central opening in sprue bushing 33 and constitutes a sprue puller pin.

In mold base 10, ejector plate 42 does not rest directly upon the base 12 of ejector housing 11. It is maintained in slight spaced relation to the base of the ejector housing by means of a plurality of stop buttons 48 fitted into appropriate apertures in base member 12.

Mold base 10 is provided with guide means for guiding movement of the ejector apparatus between the normal retracted position illustrated in FIGS. 2 and 3 and the ejection position shown in FIG. 4. This guide means comprises a plurality of ejector plate return pins 51, one of which is shown in FIG. 2. Return pin 51 is mounted on the ejector support 41 in the same manner as the ejector pins 44 and projects upwardly through aligned apertures in backup plate 15 and cavity retainer plate 16.

The ejector mechanism 40 includes a further series of return pins 52 each mounted in the base member 12 of ejector housing 11 and projecting upwardly through both plates 42 and 43 of the ejector support 41 and into a cavity in backup plate 15. A return spring 53 is mounted in encompassing relation to each return pin 52, as shown in FIG. 3. One end of spring 53 is disposed within a cavity 54 in backup plate 15, whereas the other end of the return spring is disposed in a cavity 55 in ejector support 41. Spring 53 biases ejector support 41 toward the position illustrated in FIGS. 2 and 3 and thur normally maintains the ejector apparatus of the mold base in its retracted position.

As thus far described, mold base 10 is conventional in construction. However, the mold base includes an internal ejector actuating mechanism constructed in accordance with the present invention. The ejector actuating mechanism comprises two ejector actuation cylinders 61 extending into ejector support 41. In the specific construction shown in FIGS. 1-4, each of the ejector actuation cylinders 61 is a smooth cylindrical bore that extends completely through the ejector plate 42. As shown in FIGS. 2 and 3, each ejector actuation cylinder 61 has an open end facing the ejector housing base member 12, but the end of the cylinder remote from base member 12 is closed by the ejector retainer plate 43.

The internal ejector actuating mechanism of mold base 10 further comprises a pair of free pistons 62, each disposed within one of the cylinders 61. Each of the pistons 62 is provided with a resilient O-ring seal 63 near its upper end to afford a fluidtight seal between the piston and the cylinder in which it is mounted. Each of the pistons 62 projects outwardly of its cylinder into engagement with housing base member 12.

Fluid pressure means are provided for introducing fluid under pressure into the closed end of each of the ejector actuation cylinders 61, above the O-ring seal and preferably above the upper face of the piston 62 in that cylinder. This fluid pressure means, for each cylinder, comprises a small metering orifice 64 that extends upwardly from the center of the cylinder and connects with a relatively large fluid passage 65 in ejector retainer plate 43. The passages 65 from the two ejector actuation cylinders are interconnected with each other and with a fluid pressure inlet 66.

FIG. 1 illustrates a simple but effective pneumatic feed and control for the ejector actuating mechanism of mold base 10. As shown therein, the fluid inlet 66 of the mold base is connected to a two-way valve 67 by a conduit 69; valve 67 is in turn connected to an air supply. In the normal position of valve 67, as shown, the connecting line 69 is open to the atmosphere and the air supply 68 is blocked within the valve. When valve 67 is shifted to its alternate position, however, the air supply is connected to line 69 through valve 67, thus supplying air under pressure to the inlet 66 of the mold base ejector actuating mechanism.

In the use of mold base 10, the mold base is mounted in an injection molding press. At the start of a molding operation, the mold base is in the closed position illustrated in FIGS. 2 and 3. Plastic is injected into the mold through the sprue and flows down the channel 22,34 into the eight molds afforded by the cavity members 21 and the mating core members 26. When the molding operation is completed, the mold base is opened along parting line 24 as generally illustrated in FIG. 4. Actually, the mold is opened to a greater displacement than that shown in FIG. 4.

As the mold is opened, the ejector actuating mechanism of the invention is placed in operation by shifting valve 67 from its normal position, as shown in FIG. 1, to its alternate position in which air supply 68 is connected to line 69. Air under pressure is thus introduced into the top of each of the two cylinders 61, through the line 69, the inlet 66, the relatively large internal passages 65 in ejector return plate 43, and the metering orifices comprising the two ports 64. The buildup of air pressure within the top of each of the two cylinders, reacting against the pistons 62, drives the complete ejector support 41 upwardly, away from base 12, toward the ejection position illustrated in FIG. 4. The movement of the ejector support toward backup plate 15 drives ejector pins 44 through the cavity support means comprising the backup plate and cavity retainer plate 16. Thus, the pins 44 eject the molded plastic articles from the mold cavities 21. Other ejector pins, including the sprue puller pin 45, force the solidified plastic from the feed channels of the mold base.

As ejector support 41 (plates 42 and 43) moves toward backup plate 15, each of the return springs 53 (FIG. 3) is compressed. When ejection has been completed, valve 67 (FIG. 1) is returned to its normal position, again venting line 69 to the atmosphere. Consequently, the springs 53 are able to return the ejector mechanism, comprising plates 42 and 43 and ejector pins 44 and 45, to the original retracted position shown in FIGS. 2 and 3. This completes the ejection cycle for the mold base, which is then ready for a subsequent molding operation.

The ejector actuating mechanism of the present invention is completely disposed within the confines of mold base 10, except for the air supply 68 and control valve 67. It presents no difficulty in mounting the mold base in any injection molding press since there is no necessity to drill the ejector housing base member 12 to receive any knockout members mounted on the press. The actuation cylinders 61 can be located at any desired points within the ejector plate 42, and do not require the provision of any additional space-occupying mechanism within the mold base. The entire actuating mechanism is simple and inexpensive in construction and can be applied to virtually any standard mold base with a minimum of expense and difficulty. Moreover, the use of the metering orifices 64 affords a convenient means for limiting the rate of movement of the ejector apparatus and prevents any damage to the mold that might result from the ejector retainer plate 43 slamming into the surface of backup plate 15.

FIG. 5 illustrates a modification of the ejector actuating mechanism of the present invention. For the most part, the mold base in which the mechanism is illustrated corresponds in construction to that described above. Accordingly, only the backup plate 15, the ejector housing base member 12, the ejector plate 42 and the ejector retainer plate 43 are illustrated in FIG. 5, the remaining principal members of the mold base being omitted. FIG. 5 also shows one of the central support pillars 18 and one of the return pins 51.

In the construction illustrated in FIG. 5, the ejector actuation mechanism includes an actuation cylinder 71 comprising a cylindrical sleeve member 72 mounted within a complemental cylindrical opening in the ejector support 41 that extends completely through ejector plate 42 and partly through ejector retainer plate 43. The cylinder sleeve 72 is of inverted cup-shaped cross-sectional configuration, with the closed end 73 located at the opposite end of the opening in the ejector support from the ejector housing base member 12.

The ejector actuation mechanism of FIG. 5 further comprises a free piston 74 disposed within cylinder 71 and having a resilient peripheral O-ring seal 75 that seals the upper end of the piston to the cylinder wall. Piston 74 rests upon ejector housing base member 12. The upper surface of piston 74 is spaced only a short distance from the closed end 73 of the cylinder.

The means for introducing fluid under pressure into the closed end of cylinder 71, in the embodiment of FIG. 5, comprises a small metering orifice 76 in the upper sidewall of sleeve 72. The orifice 76, which comprises an inlet-outlet port for cylinder 71, communicates with a larger fluid passage 77 formed internally of ejector retainer plate 43. The fluid passage 77, as before, is connected to an air inlet coupling 66 to provide a means for connecting the mechanism to an external air supply (see FIG. 1).

The operation of the embodiment of FIG. 5 is essentially identical to that of the embodiment of FIGS. 1-4 as described above. The construction shown in FIG. 5, with cylinder 71 extending at least partially into retainer plate 43, makes it possible to lengthen the distance of travel for the ejector mechanism between its retracted and ejection positions, and is most suitable for a mold base in which a long thrust on the part of the ejector pins is necessary to assure complete clearance of the molded plastic articles from the mold base when the latter is in its open condition. If an even longer ejection displacement is required, the cylinder can be extended further into or even completely through retainer plate 43.

I claim:

1. In a mold base for plastic injection molding, of the kind comprising an ejector housing having a base member, cavity support means mount on said housing in fixed spaced relation to said base member and having at least one mold cavity mounted therein, ejector means disposed within said housing, including an ejector support and a plurality of ejector elements mounted on and extending from said ejector support through said cavity support means, and guide means for guiding movement of said ejector means between a retracted position in which said ejector support is disposed adjacent said housing base member and said ejector elements are aligned with the bottom of said mold cavity and an ejection position in which said ejector support is splaced from said housing base member and said ejector elements project into said cavity, an internal ejector actuating mechanism, completely enclosed within said housing, comprising:

at least one ejector actuation cylinder extending into said ejector support, said cylinder having an open end facing said housing base member and a closed end remote from said base member;

a free piston disposed within said cylinder in fluid sealing relation therewith and projecting outwardly of said cylinder into engagement with said housing base member;

fluid pressure means for introducing fluid under pressure into the closed end of said cylinder to drive said ejector means from its retracted position to its ejection position; and return means for returning said ejector means to its retracted position upon release of the fluid pressure within said cylinder.

2. An ejector actuating mechanism for a plastic injection mold base, according to claim 1, in which said ejector support comprises a main ejector plate having a cylindrical opening extending therethrough in a direction normal to said ejector housing base member to define the walls of said cylinder, and an ejector element retaining plate affixed to said main ejector plate and extending across the end of said opening remote from said base member to close the remote end of said opening.

3. An ejector actuating mechanism for a plastic injection mold base, according to claim 2, in which said fluid pressure means comprises a fluid passage extending through said retaining plate and terminating at a port in said closed end of said cylinder.

4. An ejector actuating mechanism for a plastic injection mold base, according to claim 3, in which said port is a metering orifice for limiting the rate of introduction of fluid into said cylinder and thereby limiting the speed of movement of said ejector means between its retracted and ejection positions.

5. An ejector actuating mechanism for a plastic injection mold base, according to claim 1, in which said cylinder comprises a cylindrical sleeve member fixedly mounted within a generally complemental cylindrical opening in said ejector support.

6. An ejector actuating mechanism for a plastic injection mold base, according to claim 5, in which said ejector support comprises a main ejector plate and an ejector element retaining plate affixed to the side of said main ejector plate opposite said housing base, and in which said cylindrical opening and said sleeve member extend completely through said main ejector plate and at least partially through said retaining plate.

7. An ejector actuating mechanism for a plastic injection mold base, according to claim 6, in which said sleeve member is of inverted cup-shaped cross-sectional configuration, with the closed end thereof at the end of said cylindrical opening remote from said housing base.

8. An ejector actuating mechanism for a plastic injection mold base, according to claim 6, in which said fluid pressure means comprises a relatively large fluid passage extending through said retaining plate into communication with said cylindrical opening, and a small metering orifice through said sleeve, interconnecting said fluid passage with the closed end of said cylinder and serving to limit the speed of movement of said ejector means between its retracted and ejection positions.

* * * * *